US010291579B2

(12) United States Patent
Youn et al.

(10) Patent No.: US 10,291,579 B2
(45) Date of Patent: May 14, 2019

(54) METHOD FOR RECOVERING IPV6 FAULT IN MOBILE COMMUNICATION NETWORK AND PCRF

(71) Applicant: LG Electronics Inc., Seoul (KR)

(72) Inventors: Myungjune Youn, Seoul (KR); Jinsook Ryu, Seoul (KR); Hyunsook Kim, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 15/212,678

(22) Filed: Jul. 18, 2016

(65) Prior Publication Data

US 2017/0026334 A1    Jan. 26, 2017

Related U.S. Application Data

(60) Provisional application No. 62/325,971, filed on Apr. 21, 2016, provisional application No. 62/195,315, filed on Jul. 22, 2015.

(51) Int. Cl.
| *H04L 12/28* | (2006.01) |
| *H04L 29/12* | (2006.01) |
| *H04L 29/06* | (2006.01) |
| *H04L 12/24* | (2006.01) |
| *H04L 29/14* | (2006.01) |
| *H04L 29/08* | (2006.01) |

(Continued)

(52) U.S. Cl.
CPC ...... *H04L 61/2007* (2013.01); *H04L 41/0686* (2013.01); *H04L 65/1006* (2013.01); *H04L 65/1016* (2013.01); *H04L 67/141* (2013.01); *H04L 69/40* (2013.01); *H04W 76/10* (2018.02); *H04W 76/30* (2018.02); *H04L 61/6059* (2013.01)

(58) Field of Classification Search
None
See application file for complete search history.

(56) References Cited

U.S. PATENT DOCUMENTS

| 2014/0317269 A1* | 10/2014 | Munoz de la Torre Alonso ......... H04L 47/20 709/224 |
| 2015/0071126 A1* | 3/2015 | Zhou ............... H04L 43/028 370/259 |
| 2016/0073282 A1* | 3/2016 | Speicher ........... H04W 28/0284 370/230 |

OTHER PUBLICATIONS

3GPP TR 23.813 V11.0.0 Study on Policy solutions and enhancements (Jun. 2011) (Year: 2011).*

* cited by examiner

*Primary Examiner* — Alex Skripnikov
*Assistant Examiner* — Lionel Preval
(74) *Attorney, Agent, or Firm* — Dentons US LLP

(57) ABSTRACT

There is provided a method for a network fault recovery. The method may be performed by a policy and charging rule function (PCRF) node and comprise: transmitting, to a traffic detection function (TDF), a first request for monitoring a session initiation protocol (SIP) based signal to be routed over a first internet protocol (IP) version based network, if a fault of the first IP version-based network is detected; receiving, from the TDF, a report indicating that the SIP based signal is detected; transmitting a first indication for initiating a IP connectivity access network (IP-CAN) session termination procedure to a packet data network gateway (P-GW). Here, the first indication may include a cause value indicating a reactivation is requested such that the P-GW enables a user equipment (UE) to perform a detach procedure and then a reattach procedure.

12 Claims, 15 Drawing Sheets

(51) Int. Cl.
*H04W 76/30* (2018.01)
*H04W 76/10* (2018.01)

METHOD FOR RECOVERING IPV6 FAULT IN MOBILE COMMUNICATION NETWORK AND PCRF

CROSS-REFERENCE TO RELATED APPLICATIONS

This application claims the benefit of priorities of U.S. Provisional application No. 62/195,315 filed on Jul. 22, 2015 and U.S. Provisional application No. 62/325,971 filed on Apr. 21, 2016, all of which are incorporated by reference in their entirety herein.

BACKGROUND OF THE INVENTION

Field of the Invention

The present invention relates to mobile communication.

Discussion of the Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE-POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the |

TABLE 1-continued

| REFERENCE-POINT | DESCRIPTION |
|---|---|
|  | 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows a connection between an EPC and an IP Multimedia Subsystem (IMS).

Referring to FIG. 6, the EPC is illustrated to include an MME 51, an S-GW 52, a P-GW 53a connected to the IMS, a P-GW 53b connected to the Internet, a Policy and Charging Rule Function (PCRF) 58 connected to the P-GW 53b, and a Traffic Detection Function (TDF) 59 connected to the PCRF 58.

The TDF 59 is a functional entity that performs application detection and reporting of detected application and its service data flow description to the PCRF 58. The TDF supports solicited application reporting and/or unsolicited application reporting.

The IMS is a network technology which enables packet switching (PS) based on an Internet Protocol (IP) with respect to wireless terminals in addition to wired terminals, and has been proposed in order to connect both wired/wireless terminals through an IP (All-IP).

Such an IMS-based network includes a Call Session Control Function (CSCF) and an Interconnection Border Control Functions (IBCF) 62 for processing procedures for control signaling, registration, and a session. The CSCF includes a Proxy-CSCF (P-CSCF) 61 and a Serving-CSCF (S-CSCF) 63. Furthermore, the CSCF may include an Interrogating-CSCF (I-CSCF). The P-CSCF 61 operates as a first access point for User Equipment (UE) within the IMS-based network. Furthermore, the S-CSCF 63 processes a session within the IMS-based network. That is, the S-SCSF 63 is an entity responsible for routing signaling, and routes a session within the IMS-based network. Furthermore, the I-CSCF operates as an access point with another entity within the IMS-based network.

An IP-based session is controlled by a Session Initiation Protocol (SIP) under such an IMS. The SIP is a protocol for controlling a session. The SIP refers to a signaling protocol that specifies a procedure by which terminals to communicate with each other check their locations by identifying them and generate a multimedia service session between them or delete or change the generated session. Such an SI uses an SIP Uniform Resource Identifier (URI) similar to an E-mail address in order to distinguish users from each other so that a service can be provided without being dependent on the address of an Internet Protocol (IP). Such an SIP message is a control message, but is transmitted between UE and the IMS network through an EPC user plane.

Referring to FIG. 6, the first P-GW 53a of the EPC is connected to the P-CSCF 61 of the IMS. The P-CSCF 61 is connected to the IBCF 62. The IBCF 62 is connected to the S-CSCF 63.

Furthermore, the second P-GW 53b of the EPC is connected to the network of an Internet service provider.

When a specific network node within the EPC experiences a fault, the entire service is stopped.

Accordingly, in a related art, there is suggested a control mechanism for changing a route to a normal network node instead of a network node having a fault and continuing to providing a service when a specific network node experiences a fault.

In a related art, however, although a fault is generated in a specific data network, for example, an IPv6-based network providing a VoLTE service, an efficient mechanism is not present in which the specific data network switches to a different kind of a data network capable of providing the VoLTE service, that is, an IPv4 network. In this case, in order to solve the network fault, a service provider has to perform a task for disconnecting the connection of terminals, connecting the terminals again, and re-establishing a connection to a different kind of a data network. If the number of connected terminals is many, however, there is a problem in that several hours may be taken to sequentially reconnect the terminals. Furthermore, there is a problem in that a very important service, such as VoLTE provided over a data network (e.g., an IPv6 network) having a fault, is stopped because several hours are taken as described above.

SUMMARY OF THE INVENTION

Accordingly, one disclosure of this specification is to propose a scheme capable of solving the aforementioned problems.

One disclosure of this specification provides a scheme for enabling a user to be provided with a normal service more quickly by preferentially re-connecting or reconfiguring a Mobile-Oriented (MO) or Mobile-Terminated (MT) terminal for a VoLTE call when a fault occurs in a specific data network (e.g., an IPv6 network).

In more detail, in order to achieve the aforementioned purpose, one disclosure of the present specification provides a method for a network fault recovery. The method may be performed by a policy and charging rule function (PCRF) node and comprise: transmitting, from the PCRF node to a traffic detection function (TDF), a first request for monitoring a session initiation protocol (SIP) based signal to be routed over a first internet protocol (IP) version based network, if a fault of the first IP version-based network is detected; receiving, by the PCRF node and from the TDF, a report indicating that the SIP based signal is detected; transmitting, from the PCRF node, a first indication for initiating a IP connectivity access network (IP-CAN) session termination procedure to a packet data network gateway (P-GW), wherein the first indication includes a cause value indicating a reactivation is requested such that the P-GW enables a user equipment (UE) to perform a detach or PDN disconnection procedure and then a reattach or PDN establishment procedure; and transmitting, to the P-GW, a second request for reallocating a second IP version based address to the UE.

The method may further comprise: receiving, by the PCRF node and from the P-GW, a second indication for initiating a IP-CAN session establishment procedure.

Here, if the second indication includes a first IP version based address allocated to the UE, the second request may include a cause value indicating the fault of the first IP version-based network and is transmitted in response to the second indication.

The first indication may further include a cause value indicating the fault of the first IP version-based network.

The first indication may be transmitted together with the second request. Here, the first indication may include the second request.

In more detail, in order to achieve the aforementioned purpose, one disclosure of the present specification provides a policy and charging rule function (PCRF) node for performing for a network fault recovery. The PCRF node may comprise: a transceiver; and a processor configured to control the transceiver and perform steps of: transmitting, to a traffic detection function (TDF), a first request for monitoring a session initiation protocol (SIP) based signal to be routed over a first internet protocol (IP) version based network; receiving, from the TDF, a report indicating that the SIP based signal is detected; transmitting a first indication for initiating a IP connectivity access network (IP-CAN) session termination procedure to a packet data network gateway (P-GW), wherein the first indication includes a cause value indicating a reactivation is requested such that the P-GW enables a user equipment (UE) to perform a detach or PDN disconnection procedure and then a reattach or PDN establishment procedure; and transmitting, to the P-GW, a second request for reallocating a second IP version based address to the UE.

According to a disclosure of the present invention, the above problem of the related art is solved

DETAILED DESCRIPTION OF THE EMBODIMENTS

Figure 1:
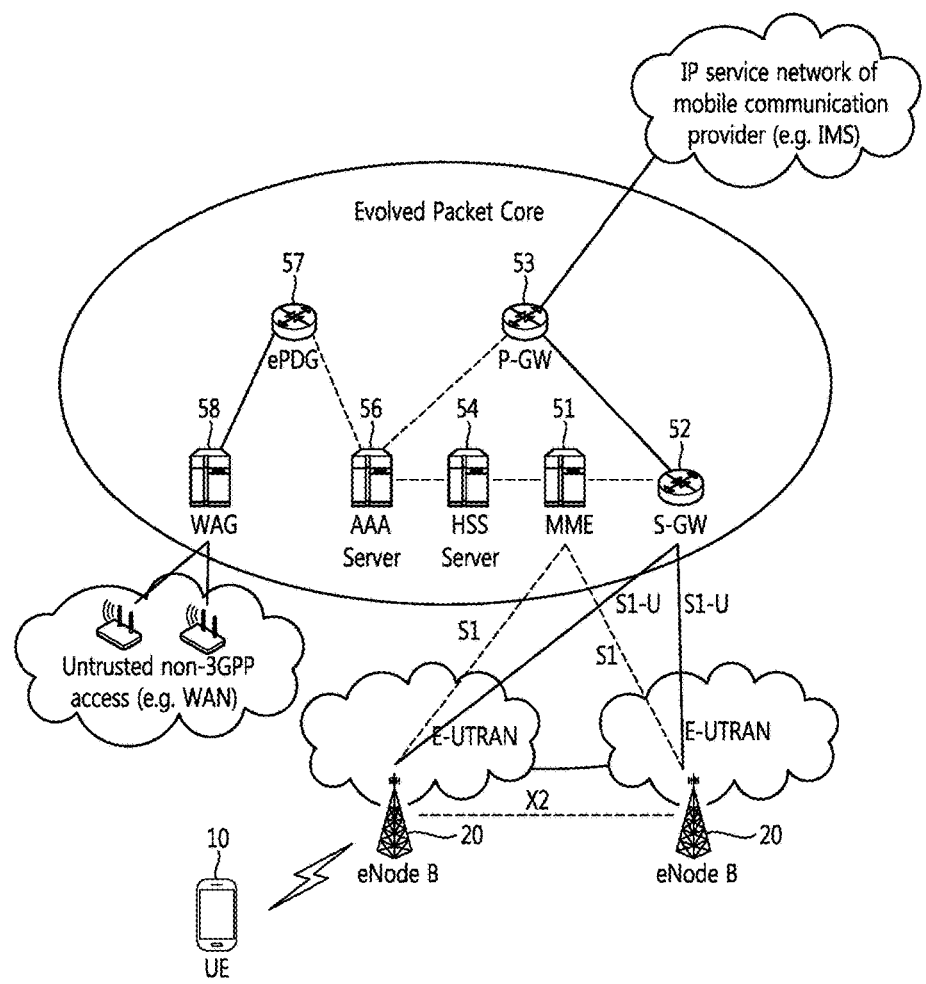
FIG. 1 is a structural diagram of an evolved mobile communication network.
Figure 2:
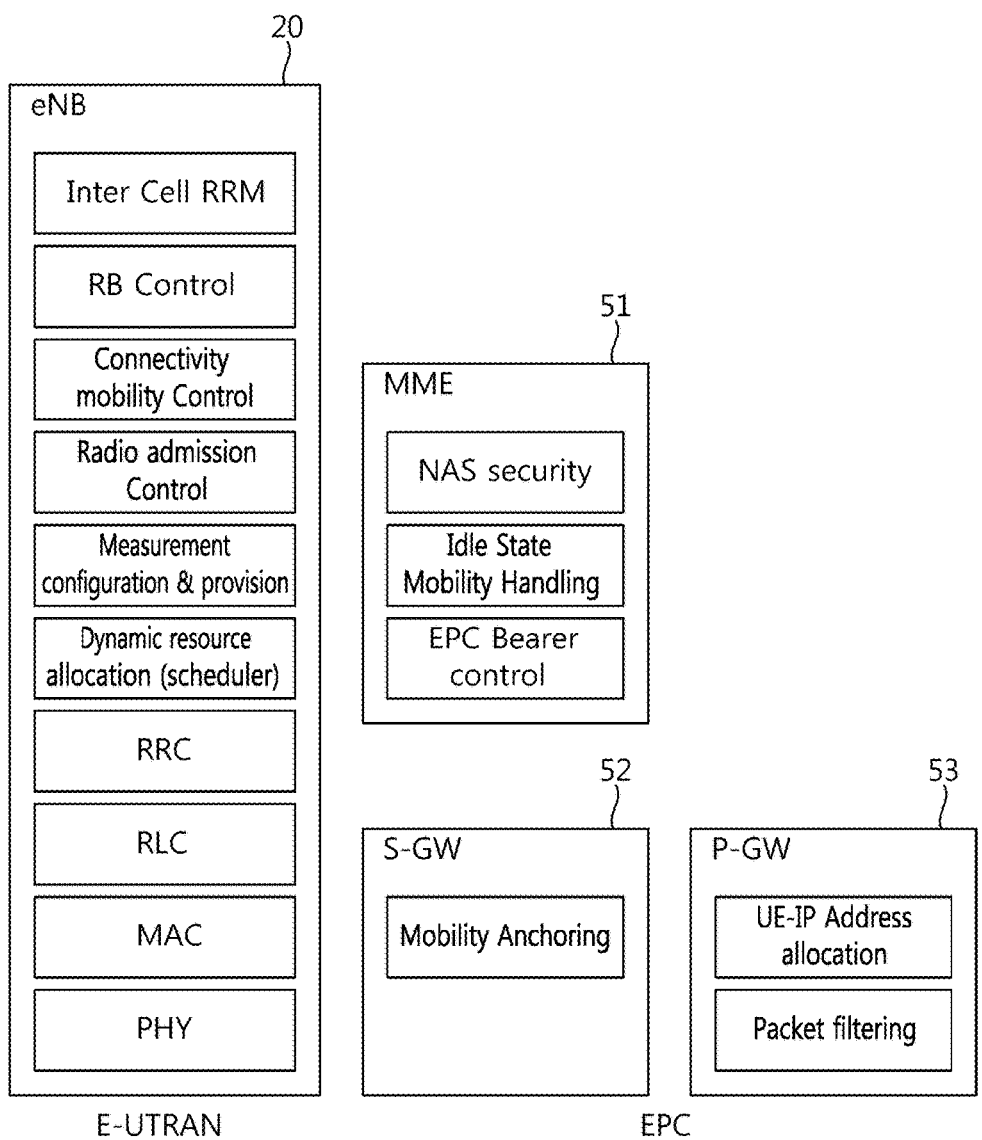
FIG. 2 is an exemplary diagram illustrating architectures of a general E-UTRAN and a general EPC.
Figure 3:
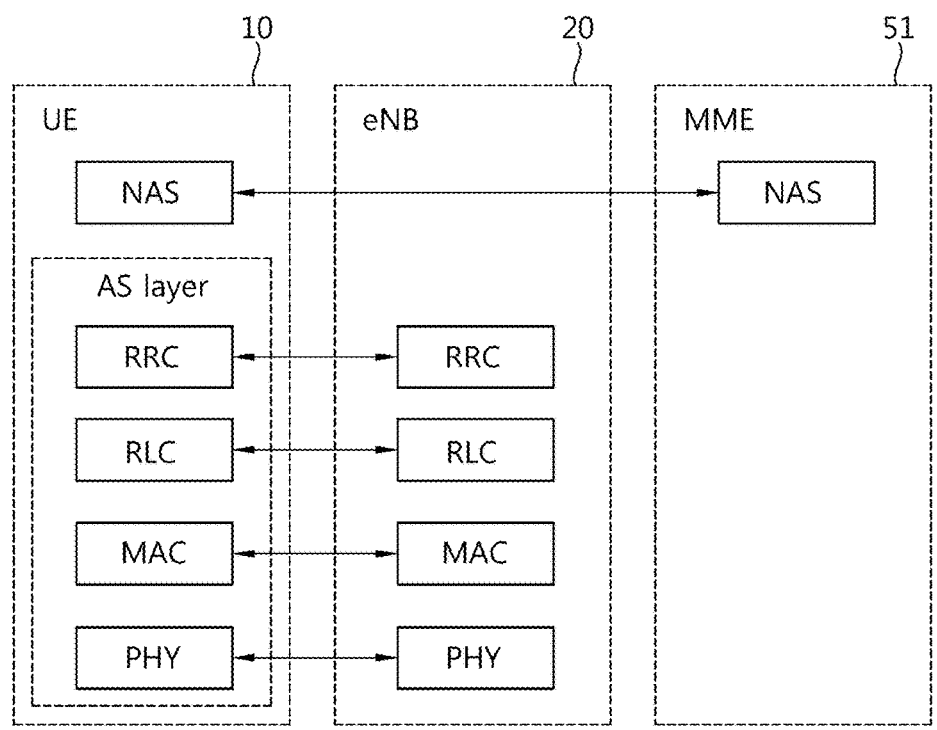
FIG. 3 is an exemplary diagram illustrating a structure of a radio interface protocol on a control plane between UE and eNodeB.
Figure 4:
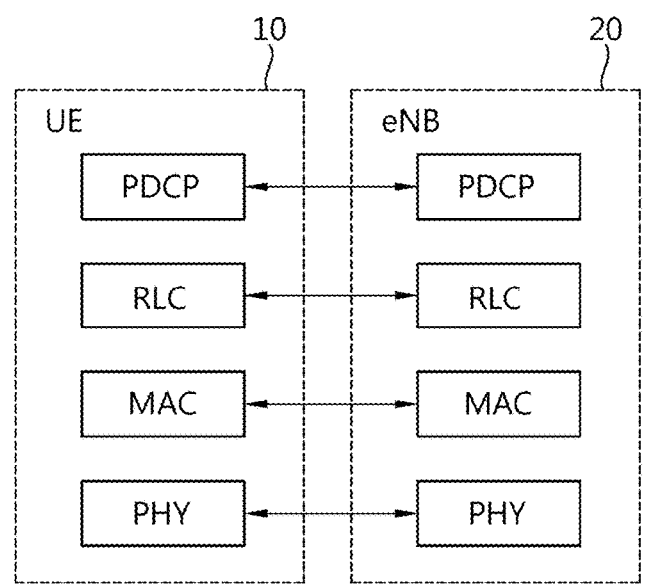
FIG. 4 is another exemplary diagram illustrating a structure of a radio interface protocol on a user plane between the UE and a base station.
Figure 5A:
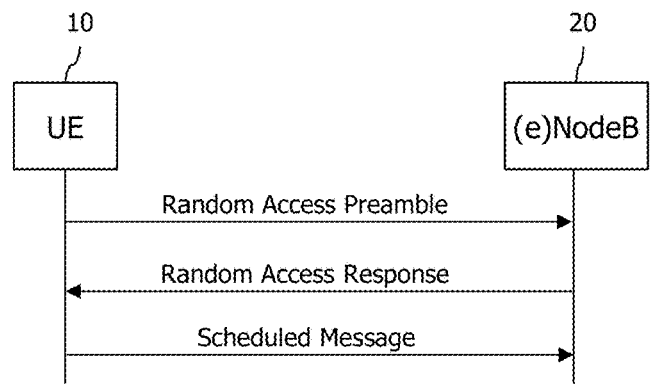
FIG. 5*a* is a flowchart illustrating a random access process in 3GPP LTE.
Figure 5B:
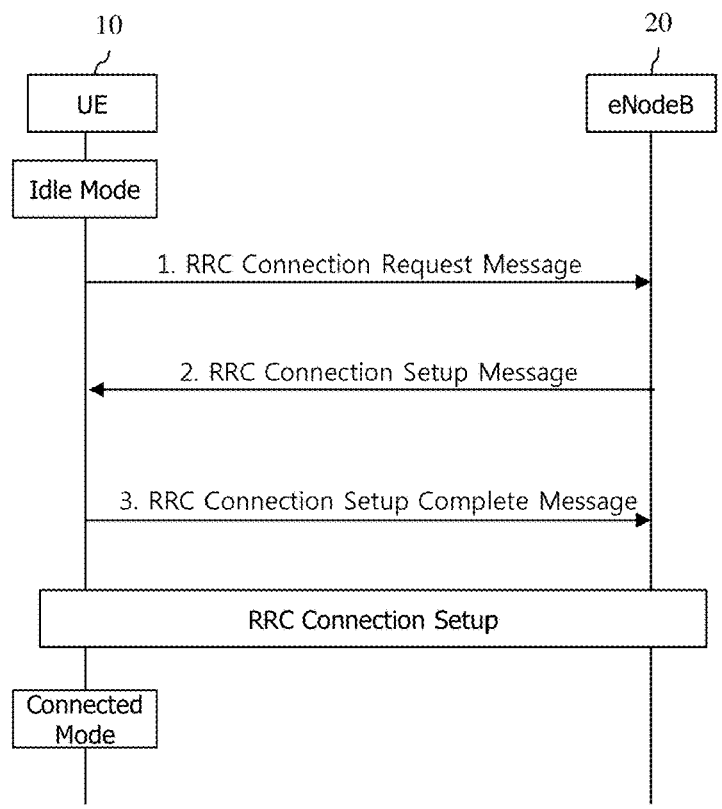
FIG. 5*b* illustrates a connection process in a radio resource control (RRC) layer.
Figure 6:
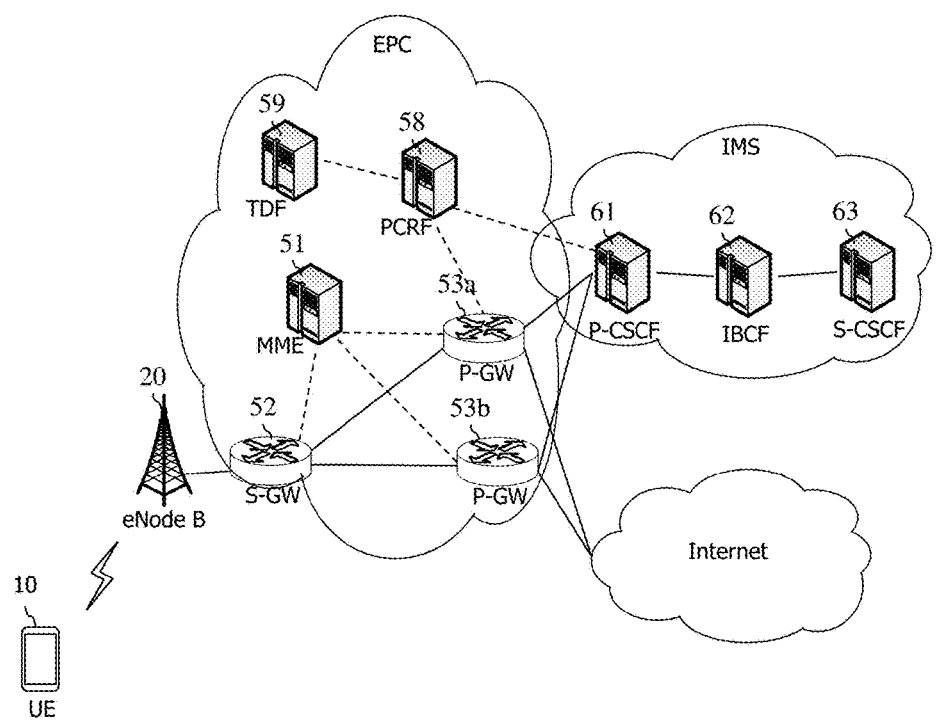
FIG. 6 shows a connection between an EPC and an IP Multimedia Subsystem (IMS).

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

Each of embodiments proposed herein may be implemented solely, but the embodiments may be implemented in combination.

UE (or a terminal) assumed in the following embodiments is a terminal capable of supporting both IPv4 and IPv6. UE capable of IPv4 and IPv6 according to a related art requests an IPv4v6 type of a PDN configuration. In a network, one of the IPv4, IPv6, and IPv4v6 types is determined based on subscriber information in accordance with the policy of a service provider, and UE is notified of the determined type. In this specification, as described above in connection with the aforementioned problematic scenario, a service provider has configured a network so that a VoLTE service is basically provided over an IPv6 PDN. When a fault is generated in a network, such as that some or all of nodes of an IPv6 PDN or network nodes are unable to recognize them due to a fault of a DNS providing IP address information on which each node is recognized other than a physical fault, a situation in which a service is provided over an IPv4 PDN is assumed and described.

Figure 7:
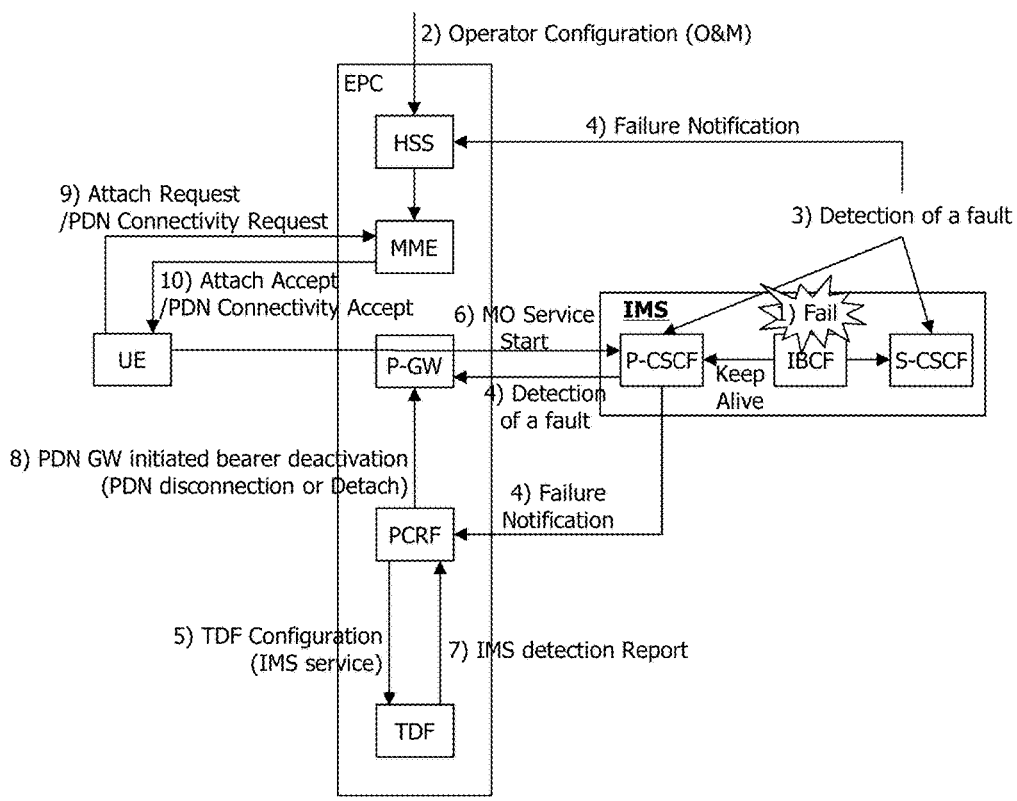
FIG. 7 is an exemplary diagram illustrating the concept of schemes according to a disclosure of this specification if UE performs a Mobile-Oriented (MO) service.

FIG. 7 is an exemplary diagram illustrating the concept of schemes according to a disclosure of this specification if UE performs a Mobile-Oriented (MO) service.

1) A fault is generated in a specific IP version (e.g., IPv6)-based network in an IMS-based network. Accordingly, the provision of an IMS service using the specific IP version is impossible.

2) When the generation of the fault is detected, a service provider configuration is transferred to an HSS for a fault recovery. A detailed process is as follows.

i. When the stop of the IMS service is detected due to the generation of the fault, a configuration is performed so that the HSS starts a fault recovery ii. When the S-CSCF detects the fault through the transmission/reception of a keep-alive signal, it notifies the HSS of the fault iii. When the HSS detects that the fault was generated in a network of a specific IP version using the method i or ii, it notifies the MME of the generation of the fault. Accordingly, the MME transmits a create session request message, including a PDN type in which a different IP version has been set so that UE newly performing "Attach" or a newly established PDN connection passes through a network not having a fault, to the P-GW.

3) Likewise, the P-CSCF detects that the fault for which communication with an IMS node over the network of the specific IP version is impossible was generated through the transmission/reception of a keep-alive signal.

4) The P-CSCF notifies the PCRF/P-GW that the fault was generated in the network of the specific IP version.

5) The PCRF requests the TDF or PCEF (with ADC) to notify the PCRF of the detection of an IMS SIP message when the IMS SIP message is detected.

In this case, the PCRF may be notified of the detection of only an IMS SIP message that passes through the network of the specific IP version having the fault, and traffic passing through a network of an IP version that normally operates may not be detected.

6) UE transmits an IMS SIP message in order to receive a Mobile-Oriented (MO) IMS service. In this case, the IMS SIP message may pass through the network of the specific IP version having the fault.

7) Accordingly, the TDF detects that the IMS SIP message of a specific IP version that needs to pass through the faulty network has been received, and notifies the PCRF of the reception of the IMS SIP message. In this case, the PCRF may receive user information of the corresponding UE from a User Data Repository (UDR)/Subscription Profile Repository (SPR). The PCRF may identify a specific group or user based on the user information and may select UE that needs to be preferentially processed based on priority.

Alternatively, the P-GW may directly detect the IMS SIP message of a specific IP version that needs to pass through the faulty network through Deep Packet Inspection (DPI).

8) The PCRF may disconnect the IMS PDN of the corresponding UE or detach the corresponding UE by performing a PDN GW-initiated bearer deactivation procedure on the UE.

The PCRF may notify the P-GW that the network of the specific IP version has a fault through the establishment/termination of an IP Connectivity Access Network (IP-CAN) session. Alternatively, the P-CSCF may notify the P-GW of the fault in the process 4).

The P-GW may notify the UE that the re-registration of the IMS is necessary through a new IP version by transmitting a message, including a cause value set as an "IMS IP version fault", to the UE.

If a PDN disconnection is indicated by the P-GW, the MME transfers a deactivate EPS Bearer Context Request message, including a cause value set as "PDN type IPv4 only allowed" or "PDN type IPv6 only allowed", to the UE. If "Detach" is indicated by the P-GW, the MME transfers a Detach request message, including a cause value set as "re-attach required", to the UE so that the UE is induced to be re-attached.

9-10) The UE attempts "attach" or newly establishes an IMS PDN connection by checking the cause value set within the deactivate EPS Bearer Context Request message or the Detach request message received from the MME.

The P-GW may allocate the address of a different IP version to the UE so that the UE passes through a network in which a fault is not generated. In one scheme for such allocation, the MME is aware of the fault situation, and thus may request the P-GW to allocate the address of the different IP version that needs to pass through the network in which a fault is not generated to the UE. In an alternative scheme, the P-GW may allocate the address of the different IP version to the UE so that the UE uses the network in which a fault is not generated because the P-GW may detect that a fault is present in the network of the specific IP version through the establishment of an IP-CAN session with the PCRF. In yet another scheme, if the PCRF includes a PDN Type configured as an IP version related to the faulty network in a PCC rule and transfers the PCC rule to the P-GW, the P-GW may allocate the address of the different IP version to the UE according to the PCC rule.

After the IMS PDN connection is newly established and the attach procedure is successfully performed, the UE performs IMS registration.

After the UE performs the IMS registration again as described above, it may request an MO IMS service. For example, if the UE detects that a failure in the previous request of an MO IMS service is caused by a fault in a network of a specific IP version, the UE may attempt IMS registration again even without a user input and request an MO IMS service. In this case, the UE may detect that a fault is present in the network of the specific IP version based on whether the deactivate EPS Bearer Context Request or the Detach request message is received from the MME within a specific time after the UE sends the IMS SIP message. Alternatively, the UE may detect that a fault is present in the network of the specific IP version based on explicit information received from the MME.

Figure 8:
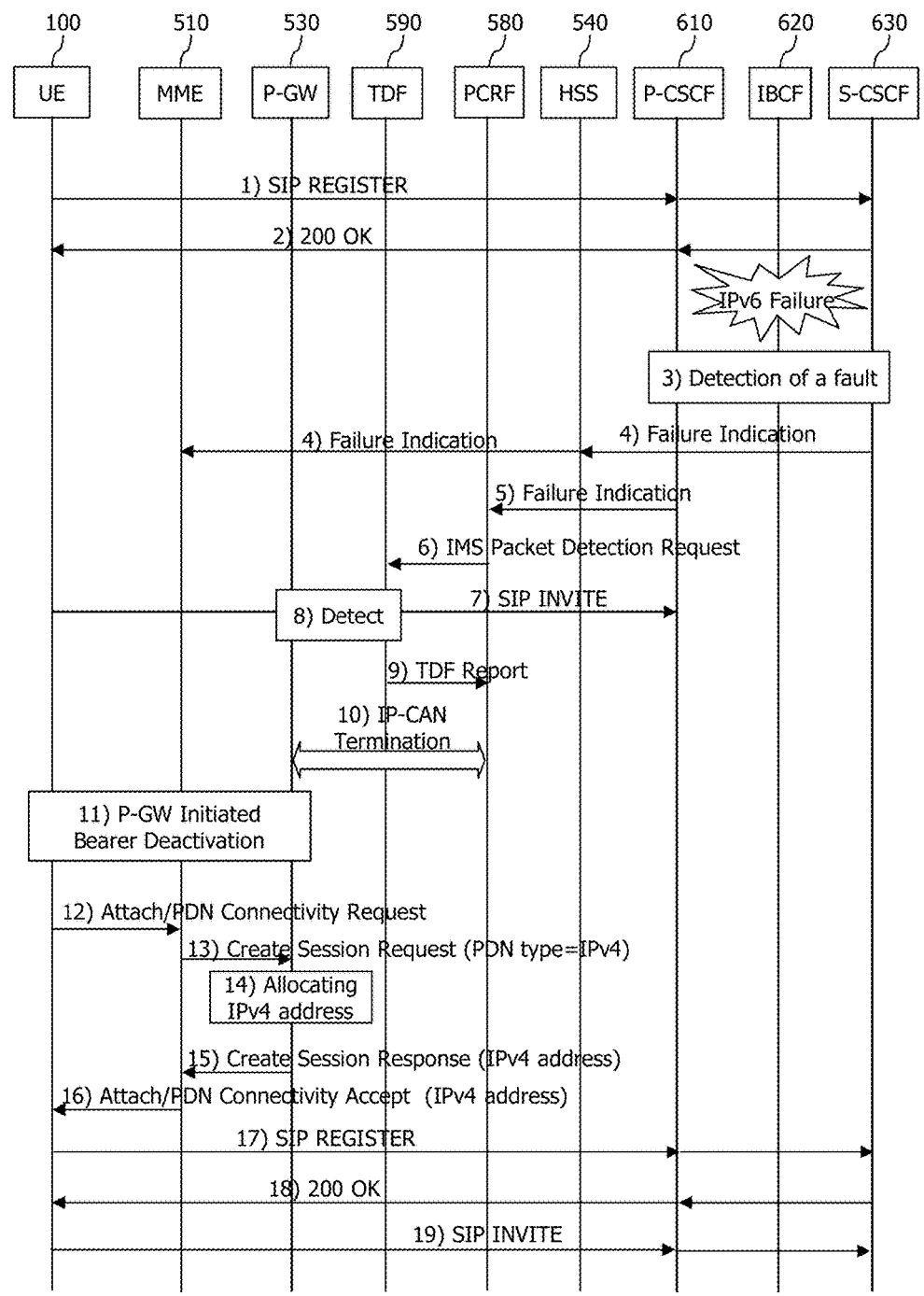
FIG. 8 is a flowchart illustrating a first scheme according to a disclosure of this specification in a situation in which UE performs an MO service.

FIG. 8 is a flowchart illustrating a first scheme according to a disclosure of this specification in a situation in which UE performs an MO service.

As shown in FIG. 8, in accordance with the first scheme, when a TDF detects the transmission/reception of an IMS SIP message that needs to pass through an IPv6-based network having a fault, a fault recovery procedure is initiated. In this case, in accordance with the first scheme of FIG. 8, the MME may request a P-GW to allocate an IPv4 address to UE so that the IMS SIP message does not pass through the IPv6-based network having a fault. This is described in detail below.

1~2) In the state in which an IPv6 address has been allocated to the UE 100, the UE 100 transmits an SIP REGISTER message in order to be registered with an IMS and receives an SIP 200 OK message indicative of the success of the registration.

3~5) When the presence of a fault in a network node that processes the IPv6 address is subsequently detected within the IMS-based network, an S-CSCF 630 transmits indication, indicating that the fault has occurred in the network using the IPv6 address, to an HSS 540. Such information is transferred from the HSS 540 to an MME 510.

The P-CSCF 610 also detects the fault and transmits the indication to a PCRF 580.

6) Accordingly, the PCRF 580 requests the TDF 590 to monitor the transmission/reception of an IMS SIP message that needs to pass through the IPv6-based network having the fault.

7~9) When the UE 100 transmits an IMS SIP message that needs to pass through the IPv6-based network having the fault, the TDF 590 detects the IMS SIP message. Furthermore, the TDF 590 reports the detection to the PCRF 580.

10-11) The PCRF 580, together with a P-GW 530, performs an IP-CAN termination procedure in order to perform a Detach or PDN disconnection on the UE 100. Accordingly, the P-GW 530 performs a P-GW-initiated bearer deactivation procedure. Specifically, the P-GW 530 transmits a Delete Bearer Request message to the MME 510. In this case, information indicating that "Reattach" is necessary using IPv4 may be included in the Delete Bearer Request message transmitted from the P-GW 530 to the MME 510 because the IPv6-based network has the fault. The MME 510 detects that the fault is present in the IPv6-based network based on the information received from the P-GW, and transmits a Deactivate bearer context request message to the UE 100. In this case, "Reactivation Requested" may be set in a cause field within the Deactivate bearer context request message.

12) After the Detach or PDN disconnection is performed, the UE 100 transmits an Attach request message or PDN Connectivity Request message to the MME 510 in order to perform "Reattach" or PDN establishment.

13) After detecting that the fault is present in the IPv6-based network, the MME 510 sets a PDN Type within a Create Session Request message as IPv4 so that an IPv4 address is allocated to the UE 100, and transmits the set PDN type to the P-GW 530.

14-16) The P-GW 530 allocates the IPv4 address to the UE 100 instead of the IPv6 address because the IPv6-based network having the fault. Furthermore, the P-GW 530 transmits a Create Session Response message, including the allocated IPv4 address, to the MME 510. The MME 100 transmits an Attach Accept message or a PDN Connectivity Accept message to the UE 100.

17-19) when the IPv4 address is successfully allocated to the UE 100, the UE 100 performs registration on the IMS again and continues to perform a service request.

Figure 9:
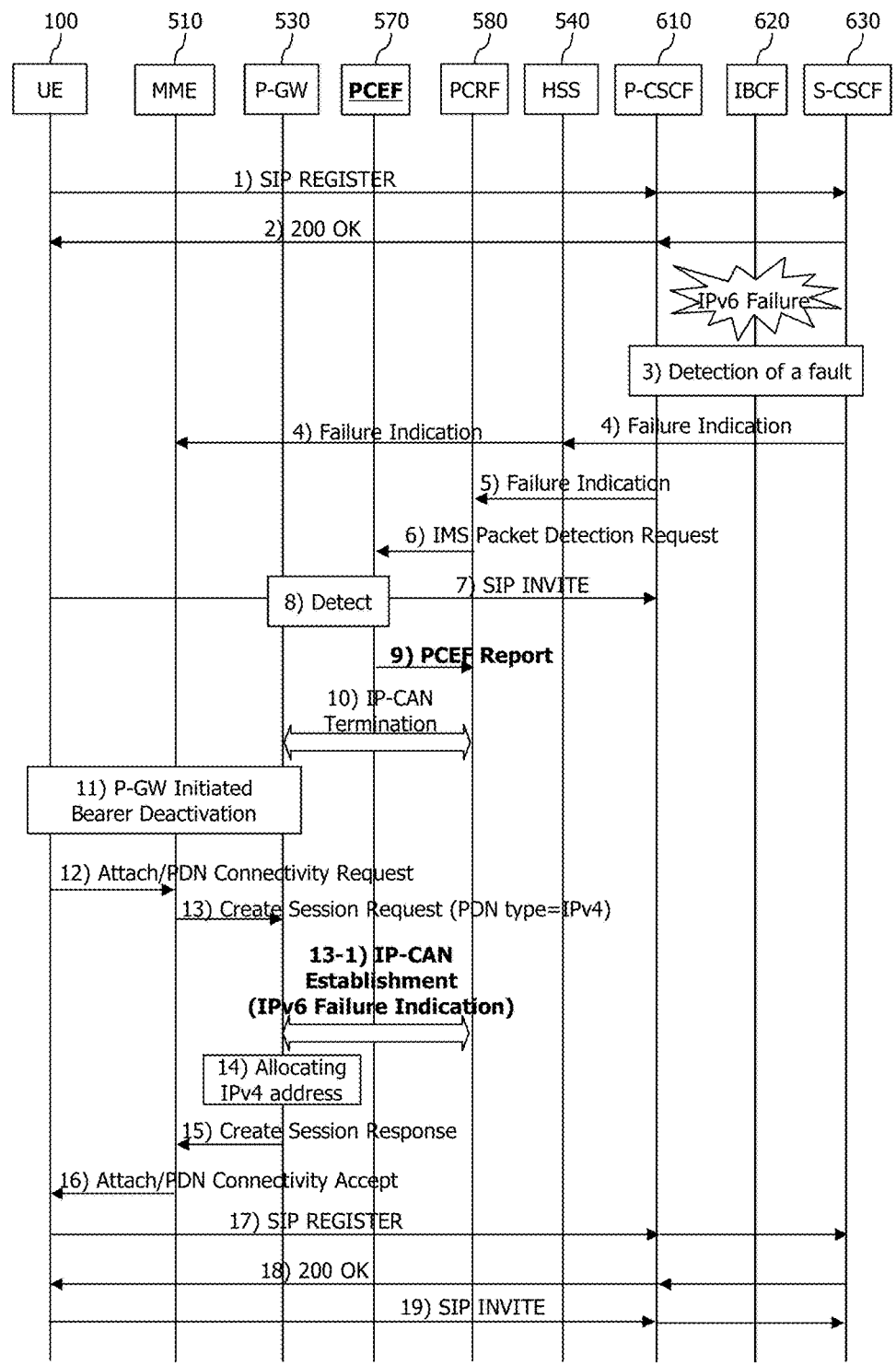
FIG. 9 is a flowchart illustrating a second scheme according to a disclosure of this specification in a situation in which UE performs an MO service.

FIG. 9 is a flowchart illustrating a second scheme according to a disclosure of this specification in a situation in which UE performs an MO service.

Unlike in the first scheme of FIG. 8, in accordance with the second scheme of FIG. 9, the transmission/reception of an IMS SIP message is detected by the PCEF (with enhanced ADC). Furthermore, during an IP-CAN establishment procedure, the PCRF notifies the P-GW that a fault is present in an IPv6-based network, and thus the P-GW allocates an IPv4-based address to the UE. The remainder is the same as that of the first scheme of FIG. 8, and is not described again.

Figure 10A:
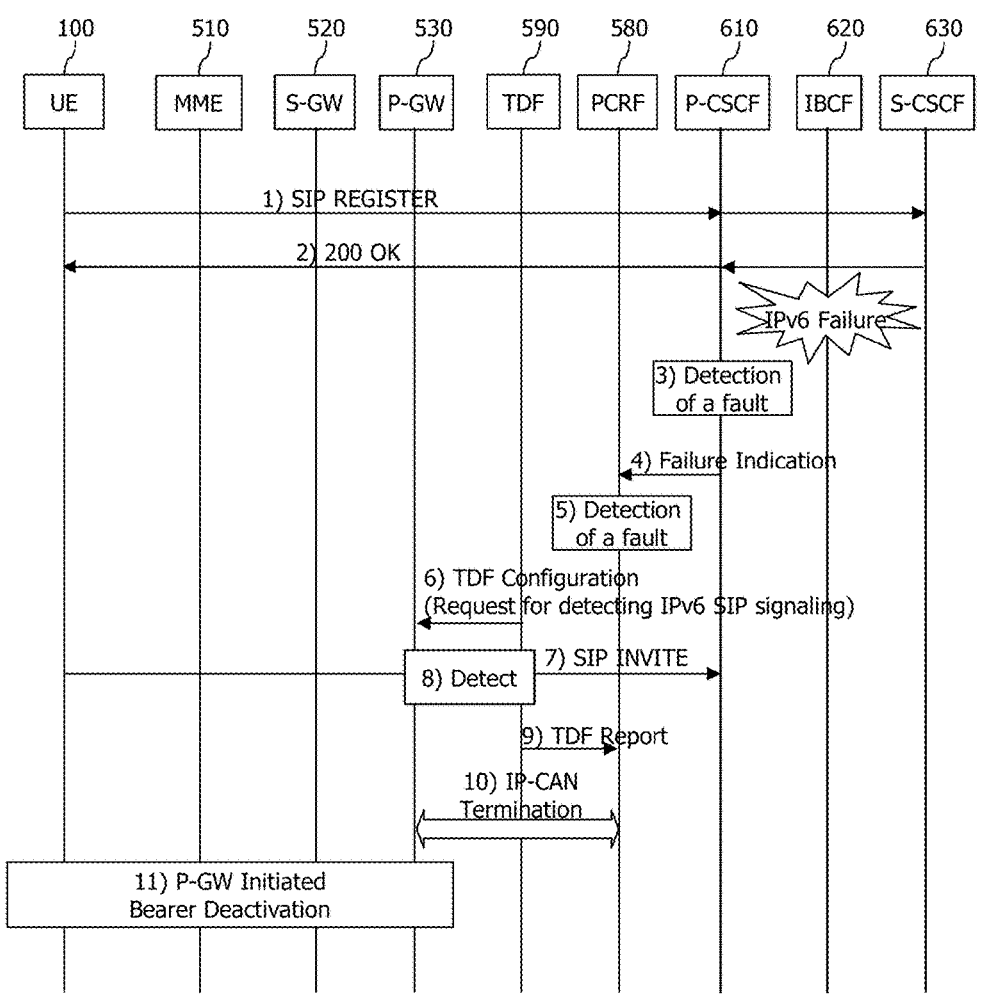
FIGS. 10*a* and 10*b* are flowcharts illustrating a third scheme according to a disclosure of this specification in a situation in which UE performs an MO service.
Figure 10B:
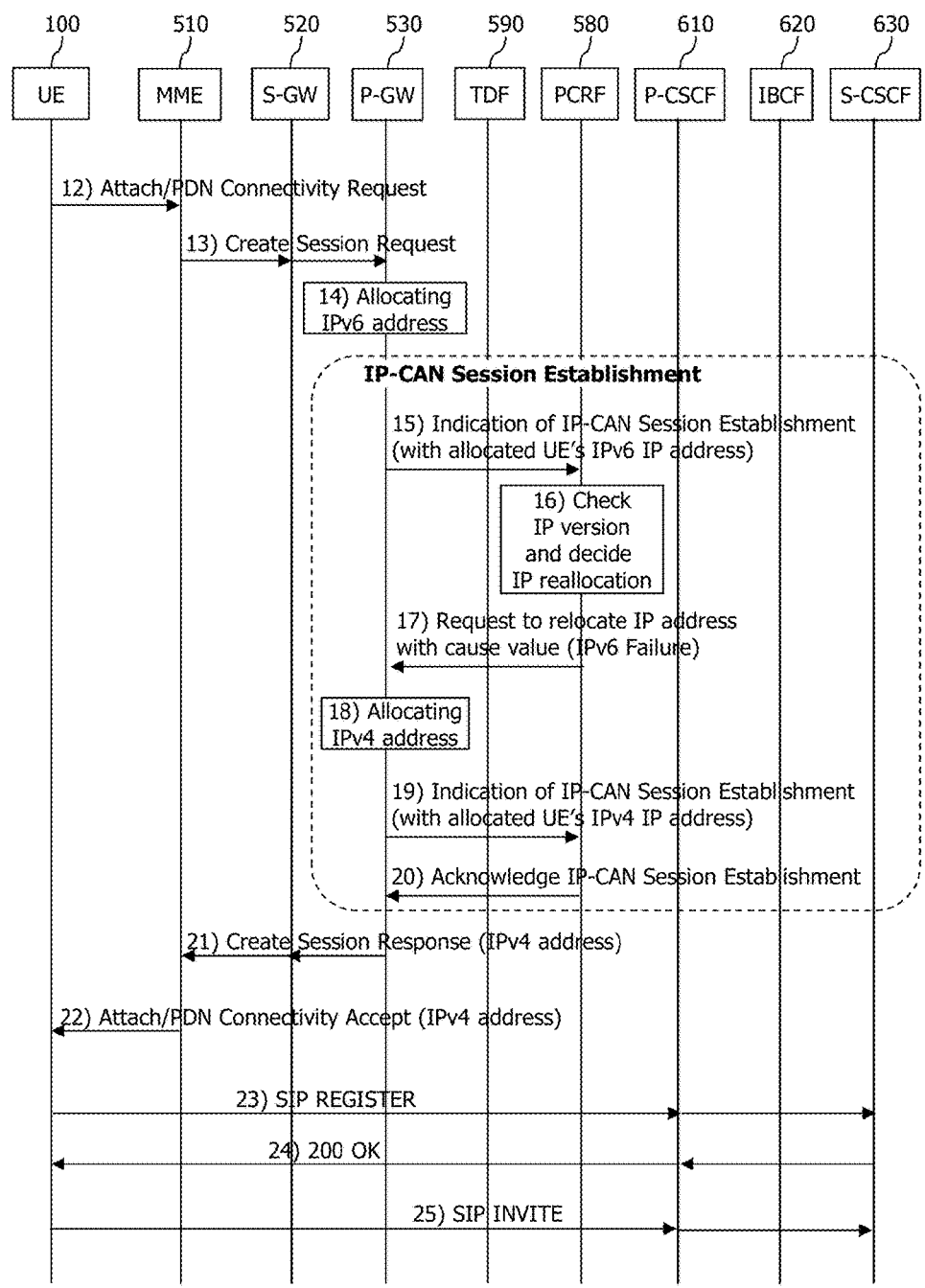

FIGS. 10*a* and 10*b* are flowcharts illustrating a third scheme according to a disclosure of this specification in a situation in which UE performs an MO service.

In accordance with the third scheme of FIGS. 10*a* and 10*b*, as in the first scheme, the transmission/reception of an IMS SIP message is detected by the TDF. Unlike in the first scheme of FIG. 8, however, in the third scheme of FIGS. 10*a* and 10*b*, during an IP-CAN establishment procedure, the PCRF requests the P-GW to allocate an IPv4 address that needs to pass through a network not having a fault. This is described in detail below.

A process 1) and a process 2) are the same as the process 1) and process 2) of FIG. 8 showing the first scheme, are not described redundantly, and are applied without any change.

3-4) When the presence of a fault in a network that processes an IPv6 address is detected within an IMS-based network, the P-CSCF 610 transmits indication, indicating that the fault has occurred in the IPv6-based network, to the PCRF 580.

5-6) Accordingly, the PCRF 580 detects a fault state in which IPv6 cannot be served based on the indication, and requests the TDF 590 to monitor the transmission/reception of an IMS SIP message that needs to pass through the IPv6-based network having the fault.

7-9) When the UE 100 transmits an IMS SIP message that needs to pass through the IPv6-based network, the TDF 590 detects the IMS SIP message. Furthermore, the TDF 590 reports the detection to the PCRF 580.

10-11) the PCRF 580, together with the P-GW 530, performs an IP-CAN termination procedure in order to perform "Detach" or PDN disconnection on the UE 100. Accordingly, the P-GW 530 performs a P-GW-initiated bearer deactivation procedure. Specifically, the P-GW 530 transmits a Delete Bearer Request message to the MME 510. In this case, since the IPv6-based network has the fault, information indicating that "Reattach" is necessary using IPv4 may be included in the Delete Bearer Request message transmitted from the P-GW 530 to the MME 510. After detecting that the fault is present in the IPv6-based network based on the information received from the P-GW, the MME 510 transmits a Deactivate bearer context request message to the UE 100. In this case, "Reactivation Requested" may be set in a cause field within the Deactivate bearer context request message.

12-13) After the Detach or PDN disconnection is performed, the UE 100 transmits an Attach request message or a PDN Connectivity Request message to the MME 510 in order to perform "Reattach" or PDN establishment. The MME 510 transmits a Create Session Request message to the P-GW 530. In this case, a PDN type within the Create Session Request message may be configured as IPv4v6. The PDN type configured as the IPv4v6 indicates that the PDN is connected using any one of an IP version 4 and an IP version 6.

14-15) The P-GW 530 allocates an IPv6 address to the UE because it does not detect that the fault is present in the IPv6-based network and the PDN type within the received Create Session Request message has been configured as the IPv4v6. Furthermore, the P-GW 530 transfers the IPv6 address allocated to the UE to the PCRF 580 while performing an IP-CAN Session Establishment procedure.

16-17) However, the PCRF 580 checks that the fault is present in the IPv6-based network as a result of the check of the version of the IP address allocated to the UE. Accordingly, the PCRF 580 determines that the IP address of a different version needs to be reallocated. In this case, the PCRF 580 may receive user information about the UE 100 from a UDR/SPR, may identify a specific group or user based on the user information, and may select UE that needs to be preferentially processed based on priority. The PCRF 580 transmits a message that requests the reallocation of the IP address of the different version to the P-GW 530. A value indicative of the fault of the IPv6-based network is configured in a cause field within the request message.

18-20) The P-GW 530 reallocates an IPv4 address to the UE based on the cause field within the request message and transfers the IPv4 address, allocated to the UE, to the PCRF 580. If the PCRF 580 checks that the IPv4 address allocated to the UE is an IPv4 address that will pass through a normally operating network as a result of the check of the version of the allocated IP address, it transmits an IP-CAN session establishment response to the P-GW 530.

21-22) The P-GW 530 transmits a Create Session Response message, including the allocated IPv4 address, to the MME 510. The MME 100 transmits an Attach Accept message or a PDN Connectivity Accept message to the UE 100.

23-25) When the IPv4 address is successfully allocated to the UE 100, the UE 100 performs registration on the IMS again and continues to perform a service request.

Figure 11:
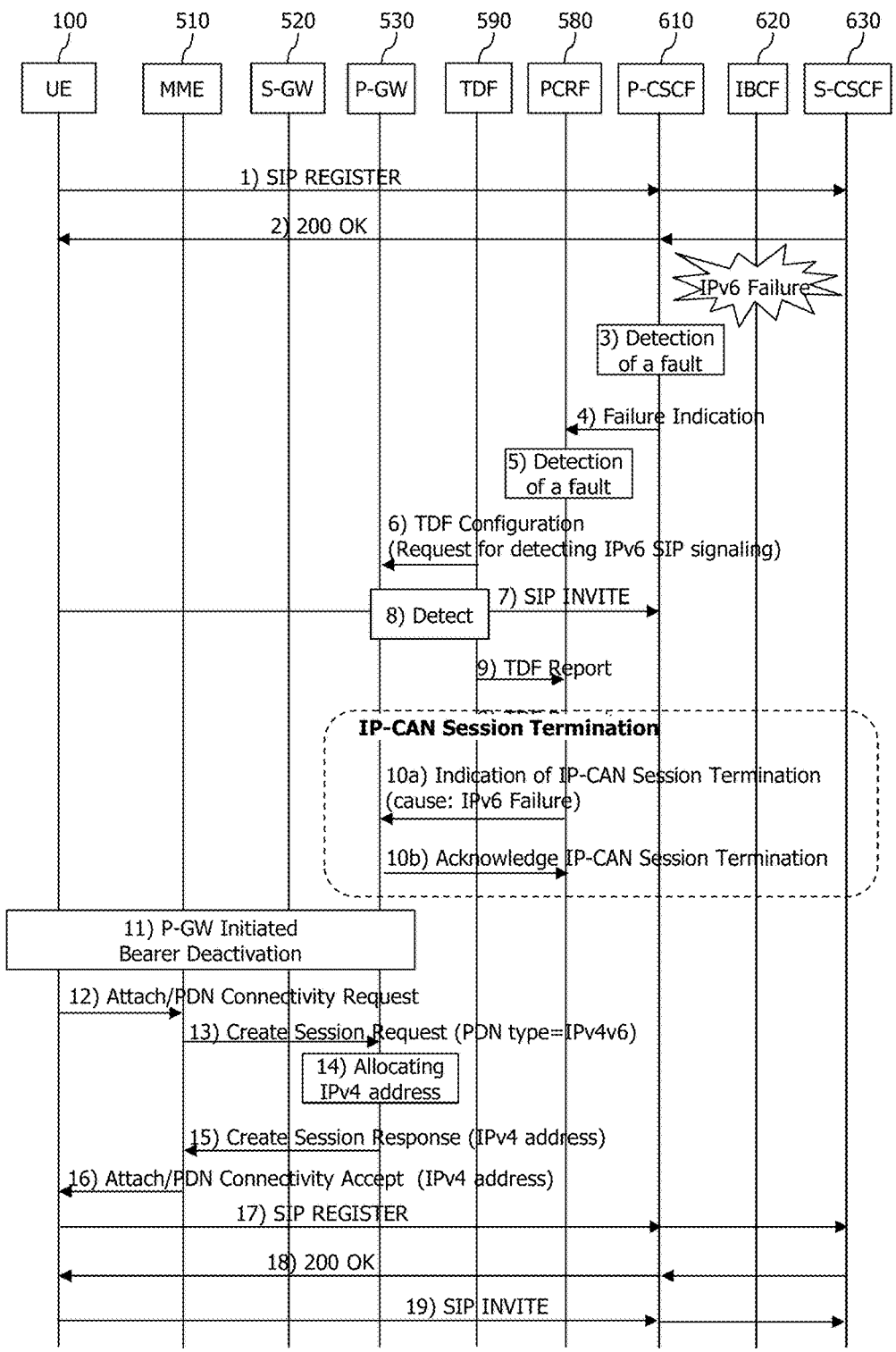
FIG. 11 is a flowchart illustrating a fourth scheme according to a disclosure of this specification in a situation in which UE performs an MO service.

FIG. 11 is a flowchart illustrating a fourth scheme according to a disclosure of this specification in a situation in which UE performs an MO service.

In accordance with the fourth scheme of FIG. 11, the transmission/reception of an IMS SIP message is detected by the TDF as in the third scheme. In this case, unlike in the third scheme of FIGS. 10a and 10b, in the third scheme of FIG. 11, during an IP-CAN Termination procedure, the PCRF requests the P-GW to allocate an IPv4 address. This is described in detail below.

A process 1) and a process 9) are the same as the process 1) and process 9) of FIGS. 10a and 10b showing the third scheme, are not described redundantly, and are applied without any change.

10a-10b) The PCRF 580, together with the P-GW 530, performs an IP-CAN termination procedure in order to perform "Detach" or PDN disconnection on the UE 100. Specifically, the PCRF 580 transmits the Indication of IP-CAN Session Termination, including a cause value providing notification that the fault is present in the IPv6-based network, to the P-GW 530. Accordingly, the P-GW 530 detects the fault based on the cause value and transmits Acknowledge IP-CAN Session Termination.

11) Thereafter, the P-GW 530 performs a P-GW-initiated bearer deactivation procedure. Specifically, the P-GW 530 transmits a Delete Bearer Request message to the MME 510. The MME 510 transmits a Deactivate bearer context request message to the UE 100. In this case, "Reactivation Requested" may be set in a cause field within the Deactivate bearer context request.

12-13) After the "Detach" or PDN disconnection is performed, the UE 100 transmits an Attach request message or a PDN Connectivity Request message to the MME 510 in order to perform "Reattach" or PDN establishment. The MME 510 transmits a Create Session Request message to the P-GW 530. In this case, a PDN type within the messages may be configured as IPv4v6. The PDN type configured as the IPv4v6 indicates that a PDN may be connected using any one of an IP version 4 and an IP version 6.

14-15) The P-GW 530 detects that the fault is present in the IPv6-based network based on the cause value within the received Indication of IP-CAN Session Termination. Accordingly, although the PDN type within the received message is configured as the IPv4v6, the P-GW 530 allocates an IPv4 address and then transmits a Create Session Response message, including the allocated IPv4 address, to the MME.

Processes 16) to 19) are the same as those 16) to 19) of the first scheme.

Figure 12:
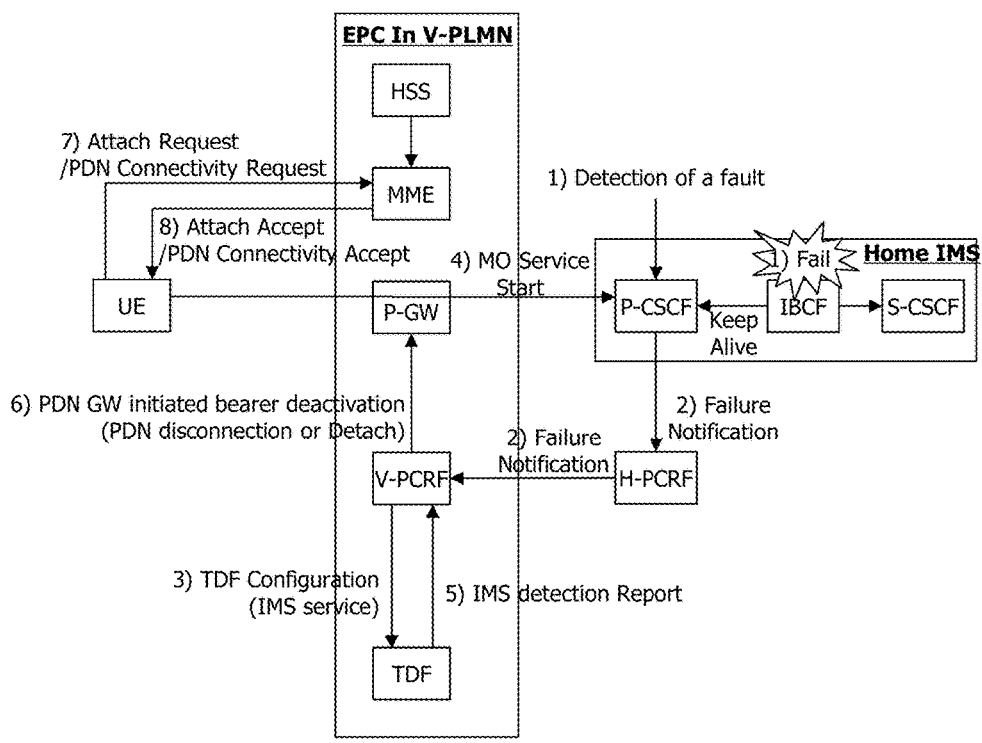
FIG. 12 is an exemplary diagram illustrating the concept of a scheme according to a disclosure of this specification in a situation in which UE has roamed a visit network.

FIG. 12 is an exemplary diagram illustrating the concept of a scheme according to a disclosure of this specification in a situation in which UE has roamed a visit network.

There are two methods for processing IMS signaling from UE in a situation in which the UE has roamed a visit network, for example, a V-PLMN. In accordance with a Home Routing (HR) method that is the first method, the S-GW of the visit network transfers the IMS signaling from the UE to the IMS-based network of the home network of the UE. In a Local Break Out (LBO) method that is the second method, the IMS signaling from the UE is transferred to an IMS-based network within the visit network. In this case, the LBO method may be processed in accordance with the schemes shown in FIGS. 8 to 10.

In the case of the HR method, however, as shown in FIG. 12, the UE accesses the IMS of the home network using the P-CSCF in the V-PLMN. This is described below.

1-2) When a fault is generated in a network of a specific IP version, the P-CSCF of an IMS in the home network of the UE detects the fault and notifies the H-PCRF of the home network of the detection of the fault. The H-PCRF detects that the UE is a roaming situation and notifies a V-PCRF within a visit network of the fault.

3) The V-PCRF requests a TDF to monitor the transmission/reception of an IMS SIP message that will pass through the network of the specific IP version having the fault.

4-5) If the UE transmits an IMS SIP message, the TDF detects the transmission of the IMS SIP message and notifies the V-PCRF of the detection.

6-8) Accordingly, the V-PCRF detaches the UE. When the UE attempts "Attach" again, the H-PCRF downloads a PCC rule onto the UE and allows an IP version not having a fault to be allocated to the UE.

FIG. 12 shows a situation in which the UE performs an MO service after roaming a visit network, but an MT service may be processed likewise. Specifically, if an IMS SIP message from the UE has to pass through an IPv6-based network having a fault, the TDF of the visit network may detect such an IMS SIP message. In this case, the P-GW of the visit network may detach the corresponding UE and then reattach the UE so that an IPv4 address not having a fault is allocated.

Figure 13:
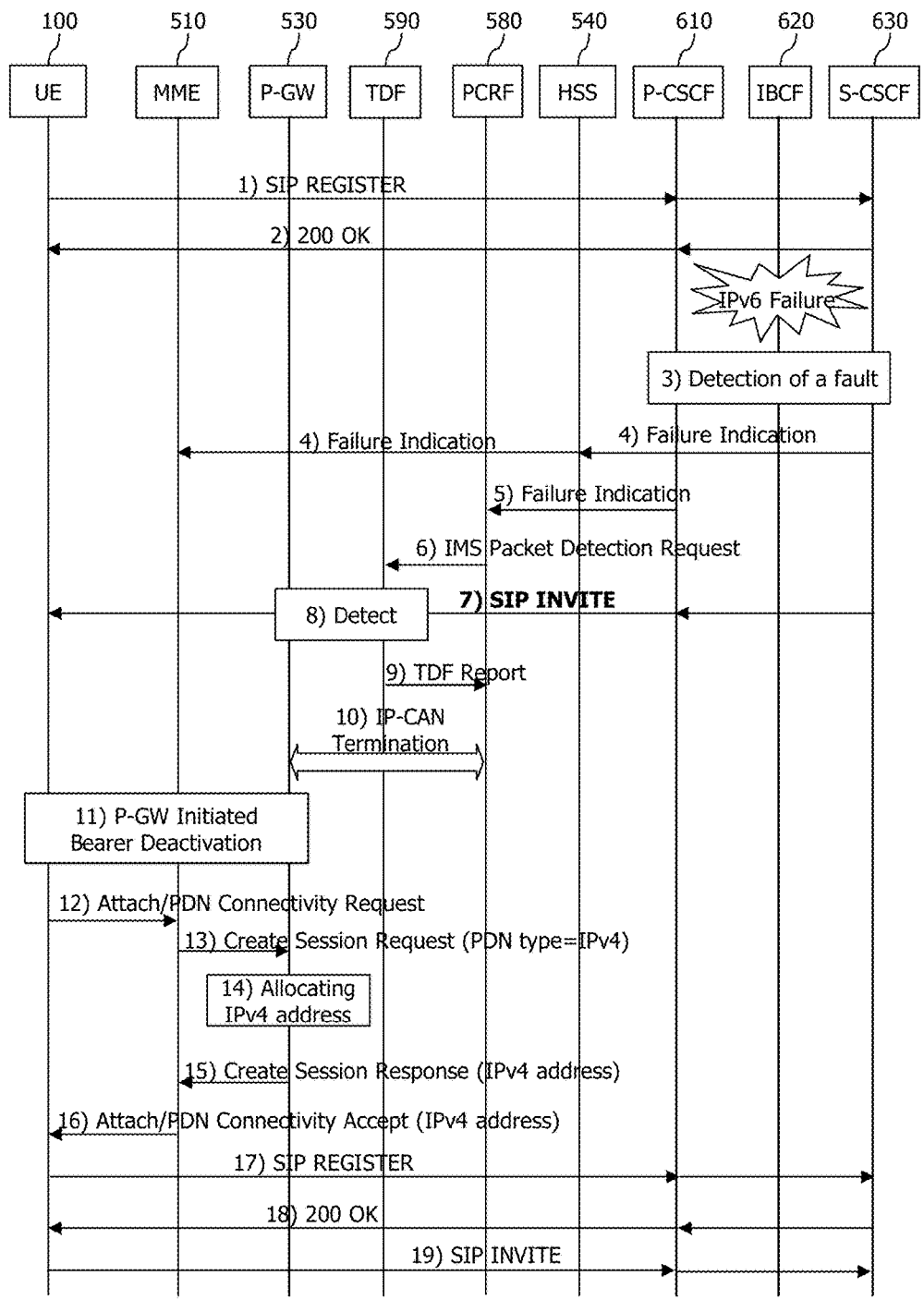
FIG. 13 is a flowchart illustrating a scheme according to a disclosure of this specification if UE performs an MT service in a situation in which the UE has roamed a visit network.

FIG. 13 is a flowchart illustrating a scheme according to a disclosure of this specification if UE performs an MT service in a situation in which the UE has roamed a visit network.

A process 1) and a process 2) are the same as the process 1) and process 2) of FIG. 8 showing the first scheme, are not described redundantly, and are applied without any change.

3-4) When a fault is generated in an IPv6-based network within an IMS-based network, the S-CSCF 630 transmits indication, indicating that the fault has occurred in the IPv6-based network, to the HSS 540. The information is transferred from the HSS 540 to the MME 510 again.

The P-CSCF 610 also detects the fault and transmits the indication to the PCRF 580.

6) Accordingly, the PCRF 580 requests the TDF 590 to monitor whether an IMS SIP message to be transferred to UE to which an IPv6-based address related to the network having the fault has been allocated is reached.

7~9) When the IMS SIP message to be transferred to UE to which an IPv6-based address related to the network having the fault has been allocated is reached, the TDF 590 detects the IMS SIP message. Furthermore, the TDF 590 reports the detection to the PCRF 580.

10-11) The PCRF 580, together with the P-GW 530, performs an IP-CAN termination procedure in order to perform "Detach" or PDN disconnection on the UE 100.

Processes 12) to 19) are the same as the processes 18) and 19) of FIG. 8, are not described redundantly, and are applied without any change.

The contents described so far may be implemented using hardware. This is described with reference to FIG. 14.

Figure 14:
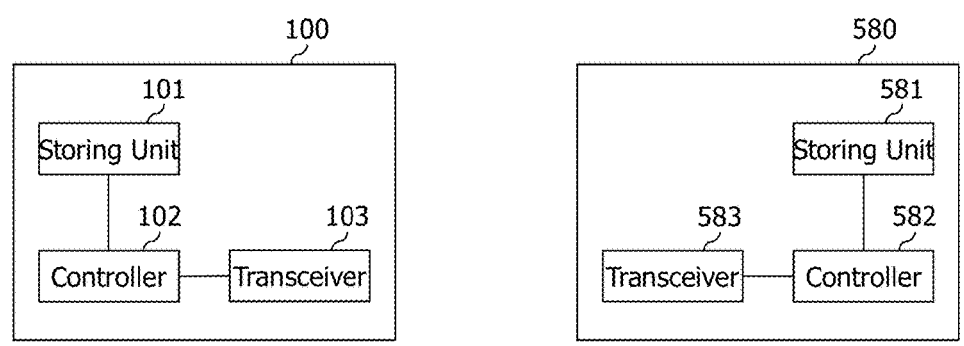
FIG. 14 is a block diagram showing the configuration of UE 100 and a network node according to an embodiment of the present invention.

FIG. 14 is a block diagram showing the configuration of UE 100 and a network node according to an embodiment of the present invention.

As shown in FIG. 14, the UE 100 includes a storing unit 101, a controller 102, and a transceiver 103. Furthermore, a network node may be the P-GW 530 or the PCRF 580. If the network node is the PCRF 580, it includes a storing unit 581 and a controller 582, and a transceiver 583.

The storing units store the aforementioned methods.

The controllers control the storing units and the transceivers. Specifically, the controllers execute the methods stored in the storing units. Furthermore, the controllers transmit the aforementioned signals through the transceivers.

In accordance with the disclosure of this specification, the problems of a conventional technology can be solved. In particular, when a network fault occurs, the time during which a service is stopped can be minimized.

Although the some embodiments of the present invention have been illustratively described, the scope of the present invention is not limited to only the specific embodiments, and the present invention may be modified, changed or improved in various forms within the spirit of the present invention and the category written in the claims.

What is claimed is:

1. A method for a network fault recovery, the method performed by a policy and charging rule function (PCRF) node and comprising:
   receiving, by the PCRF node, from a Proxy-Call Session Control Function (P-CSCF), a first indication indicating that a fault of a first internet protocol (IP) version based network has been detected;
   transmitting, from the PCRF node to a traffic detection function (TDF), a first request for monitoring a transmission of a session initiation protocol (SIP) based signal to be routed over the first IP version based network, when the first indication is received, wherein the SIP based signal is transmitted from a user equipment (UE);
   receiving, by the PCRF node, from the TDF, a report indicating that the transmission of the SIP based signal is detected;
   transmitting, by the PCRF node, to a packet data network gateway (P-GW), a second indication for initiating an IP connectivity access network (IP-CAN) session termination procedure;
   receiving, by the PCRF node, from the P-GW, a third indication for initiating an IP-CAN session establishment procedure;
   determining, by the PCRF node, whether the third indication includes a first IP version based network address allocated to the UE; and
   transmitting, by the PCRF node, to the P-GW, a second request for reallocating a second internet protocol (IP) version based network address to the UE, when the third indication includes the first IP version based network address;
   wherein the second indication includes a cause value indicating a request for reactivation, such that the P-GW enables the UE to perform a detach or PDN disconnection procedure, and then perform a reattach or PDN establishment procedure.

2. The method of claim 1, further comprising: receiving, by the PCRF node, from the P-GW, a fourth indication for initiating an IP-CAN session establishment procedure,
   wherein the forth indication includes the second IP version based network address which is allocated to the UE, by the P-GW, according to the second request; and
   transmitting, by the PCRF node, to the P-GW, an IP-CAN session establishment indication indicating an acknowledgement for the IP-CAN session establishment procedure.

3. The method of claim 1, wherein the second request includes a cause value indicating the fault of the first IP version based network.

4. The method of claim 1, wherein the second indication further includes a cause value indicating the fault of the first IP version based network.

5. The method of claim 1, wherein the second indication is transmitted together with the second request.

6. The method of claim 5, wherein the second indication includes the second request.

7. A policy and charging rule function (PCRF) node for performing a network fault recovery, the PCRF node comprising:
   a transceiver; and a processor operatively coupled to the transceiver, wherein the processor is configured to:

control the transceiver to receive, from a Proxy-Call Session Control Function (P-CSCF), a first indication indicating that a fault of a first internet protocol (IP) version based network has been detected;

control the transceiver to transmit, to a traffic detection function (TDF), a first request for monitoring a transmission of a session initiation protocol (SIP) based signal to be routed over the first IP version based network, when the first indication is received, wherein the SIP based signal is transmitted from a user equipment (UE);

control the transceiver to receive, from the TDF, a report indicating that the transmission of the SIP based signal was detected;

control the transceiver to transmit to a packet data network gateway (P-GW), a first-second indication for initiating an IP connectivity access network (IP-CAN) session termination procedure;

control the transceiver to receive, from the P-GW, a third indication for initiating an IP-CAN session establishment procedure;

determine whether the third indication includes a first IP version based network address allocated to the UE; and control the transceiver to transmit, to the P-GW, a second request for reallocating a second internet protocol (IP) version based network address to the UE, when the third indication includes the first IP version based network address, wherein the second indication includes a cause value indicating a request for reactivation, such that the P-GW enables the UE to perform a detach or PDN disconnection procedure, and then perform a reattach or PDN establishment procedure.

8. The PCRF node of claim 7, wherein the processor is further configured to:

control the transceiver to receive, from the P-GW, a fourth indication for initiating an IP-CAN session establishment procedure, wherein the forth indication Includes the second IP version based network address which is allocated to the UE, by the P-GW, according to the second request; and control the transceiver to transmit, to the P-GW, an IP-CAN session establishment indication indicating an acknowledgement for the IP-CAN session establishment procedure.

9. The PCRF node of claim 7, wherein the second request includes a cause value indicating the fault of the first IP version based network.

10. The PCRF node of claim 7, wherein the second indication further includes a cause value indicating the fault of the first IP version based network.

11. The PCRF node of claim 7, wherein the second indication is transmitted together with the second request.

12. The PCRF node of claim 11, wherein the second indication includes the second request.

* * * * *